Dec. 1, 1959    R. A. BAUDRY    2,915,655
TURBINE-GENERATOR VENTILATION
Filed Sept. 28, 1951    2 Sheets-Sheet 1

INVENTOR
René A. Baudry.
BY
*Crawford*
ATTORNEY

Dec. 1, 1959 R. A. BAUDRY 2,915,655
TURBINE-GENERATOR VENTILATION
Filed Sept. 28, 1951 2 Sheets-Sheet 2

WITNESSES:
Leon M. Garman

INVENTOR
Rene' A. Baudry
BY
G. M. Crawford
ATTORNEY

United States Patent Office 2,915,655
Patented Dec. 1, 1959

2,915,655

TURBINE-GENERATOR VENTILATION

René A. Baudry, Pittsburgh, Pa., assignor to Westinghouse Electric Corporation, East Pittsburgh, Pa., a corporation of Pennsylvania Application September 28, 1951, Serial No. 248,853

10 Claims. (Cl. 310—55)

My invention relates to improvements in the method and means for ventilating a turbine generator or other large dynamo-electric machine, whereby the currents which may be carried by the stator and rotor windings of such machines may be doubled or tripled, or more, with respect to the current-ratings which have previously been possible, without exceeding the heating-limits of said machines. There are various kinds of losses in large dynamo-electric machines, but the principal losses, constituting the bottleneck which has determined the machine rating, particularly in machines of the turbine-generator type, have been the copper losses, commonly referred to as the $I^2R$ losses. These copper losses are only a very small percentage of the rating of the entire machine, but the rating of the entire machine has been limited by the amount of losses (or heating) which could be removed by any available cooling system at the maximum permissible operating temperatures of the stator and rotor copper.

This application is a continuation-in-part of my application Serial No. 109,999, filed August 12, 1949, now abandoned.

During the course of the past twenty years hydrogen has come to replace air as the atmosphere surrounding the windings within the casings of high-power alternating-current generators, principally because the much lower density of hydrogen greatly reduced windage losses. This is all the more necessary, in modern machines of two and four poles at 60 cycles, with large rotor diameters, where peripheral rotor-velocities in excess of 28,000 feet per minute are the rule, and windage-losses are very considerably higher than at smaller peripheral velocities.

The most widely prevalent practice, in hydrogen-cooled machines, has been to operate with a hydrogen pressure of around half a pound above the surrounding atmosphere, though in recent years there has been some discussion, and testing, of operation of conventional generators at hydrogen pressures up to several atmospheres. It was found, however, that while current rating of a given generator rose at first as hydrogen pressures were increased, the rate of this increase continually declined toward a kind of saturation, and the general conclusion was that such disadvantages as increased hydrogen leakage and increased cost of generator housings which accompanied higher pressure operation made it uneconomical to consider operation at pressures above 30 pounds per square inch gauge. Through out this application the word "pressure" means "absolute pressure" when not modified by the word "gauge" or by the expression, "over the surrounding atmosphere."

These conclusions were doubtless valid for the conventional generators being tested; but under the principles of my invention the gradual decline in the rating-increase attainable by raising hydrogen-pressure is obviated, and the only practical limits to generator-rating increase through increased hydrogen-cooling will be those set by practical economic considerations.

The amount of heat which can be removed in unit time from a given ventilating duct operating at a safe temperature by a given gas flowing through it can be shown to vary, for practical purposes, in accordance with the product of the gas pressure by its linear velocity of flow. The rate of heat dissipation can therefore be increased by increasing either gas pressure or gas velocity, or both; and the increase of either factor of the above product is, broadly, within the contemplation of my invention. However, the application of these principles to commercially-salable high power turbo-generators involves certain obstacles which have to be overcome.

Practical matters of commercial design such as prime-mover speed and physical constants of rotor forgings limit the rotor (and hence the air-gap) diameter, and also the rotor length, each to a certain fixed maximum value. This in turn limits the area of magnet iron which can economically be cut away to form the slots which enclose the windings, and so makes it desirable to keep each slot cross-sections down as close as practicable to the minimum area required for the windings it is to enclose. In short, slot-area is at a premium.

In most conventional hydrogen-cooled generators of the prior art the hydrogen within the generator housing has been circulated by fan-blades, mounted near the periphery of the rotor, through cooling ducts in the magnet-iron of the rotor and stator. As a result, outflow of $I^2R$ heat from the winding-copper to the hydrogen had to traverse paths from the copper through the insulation of the windings to the slot-wall, and thence through the iron to the hydrogen stream. It was this heat-flow through insulation and iron which was largely responsible for the failure, noted in the discussions and tests mentioned above, of the generator-rating to increase uniformly as hydrogen pressure was raised.

I remove this limitation to effective hydrogen-cooling by causing the hydrogen to flow through ducts located inside the principal winding-insulation and running along each winding-conductor, so that paths are provided for heat-flow from conductor-copper to hydrogen in which practically no thermal resistance is interposed. The slots must thus enclose within their cross-section the winding-copper, the ducts and the winding-insulation. The insulation being fixed by design-constants, this means that the space for the ducts must be carved out of either winding-copper or magnet-iron. Since areas of winding-copper and magnet-iron are both at a premium the duct-area must be kept down. It is possible to show that this relationship fixes an optimum duct-area.

The ducts in my arrangement thus parallel the winding-copper in the axial slots of the stator and rotor, as the drawings herein show; and the duct length is thus fixed, as a practical matter, by the axial length of the rotor (or stator); and this length is itself fixed, as is pointed out above, by constants of mechanical design. Thus both the area and length of each duct are determined within narrow limits.

The linear velocity with which a given gas will flow through a duct of fixed length and area is fixed, according to well-known laws, by the pressure-gradient between the termini of the duct. It has become standard practice of many years standing to drive the cooling-gas in generators by the pressure-gradient produced by a single stage of fan-blades mounted near the periphery of the rotor. The pressure differential or gradient produced by such a single stage of fan-blades has, according to a well-established formula, a value of not over $$H = 0.5 \frac{V^2}{2g}$$

where V is the linear velocity with which the blades are moving, g is the acceleration of gravity, and H is the pressure-gradient expressed as "head," or height of a stationary column of the gas which would have a static pressure of the same value at its base. Since the prime-mover speed and rotor diameter are fixed at definite maximum values for standard high-power turbo alternators, value of the peripheral speed of the rotor, which is the same as V, cannot exceed about 670 feet per second. The value of H in the foregoing formula is fixed at a maximum, therefore, of 3500 feet. For a generator using hydrogen-cooling at 1 atmosphere absolute pressure this means a maximum pressure-gradient of 0.12 pound per square inch; and for hydrogen at P atmospheres a pressure -gradient of 0.12P pound per square inch.

It follows from the above that the pressure heads circulating hydrogen in prior-art generators could not have been greater than the values just given; and it also follows that unless a pump of some form other than the single-stage rotor fan-blades now conventional on turbo-alternators is used to drive cooling gas through the cooling-ducts I am proposing, the linear velocity of the gas through these ducts of fixed area and length is limited to a definite maximum value by the maximum pressure-heads which the above formulas show. But this linear velocity is one of the two factors in the product which, as already pointed out, must be increased to increase generator-ratings. However, the other factor, gas-pressure, may still be increased to increase the rating; and it is this expedient to which I resort to increase rating in generators which employ the conventional single stage fan-blades mounted on the rotor to drive cooling-gas through the cooling-ducts. Of course the cost of building generator housings strong enough for the increased gas-pressures and the increase of windage losses are economic limitations on the amount of such increase to be sought for.

Most large turbo-alternators have stator windings operating at 5000 volts or more, preferably at least 10,000 volts, while their rotor (field) windings operate at low voltage. This results in difficulty in insulating the windings from their enclosing slots in the case of the stator windings in cases where cooling ducts are to be located inside the insulation. No such difficulty arose in the case of rotor windings for which such ducts have been proposed.

The application of Graham L. Moses, Serial No. 110,010, filed August 12, 1949, patented October 30, 1951, No. 2,573,670, shows one way of insulating winding conductors having cooling-ducts, such as I propose using, by building up the insulation from separate plates and channels. Such a structure has gaps at the joints and, with air or hydrogen at around atmospheric pressure in the environment of the windings, electrical discharges to the slot-walls would rapidly ruin the insulation. However, I find that these electric discharges disappear if hydrogen at pressures of 50 pounds or more per square inch gauge is used for cooling such stator windings.

The limitation of the use of higher linear velocities as the means of securing increased generator-ratings through hydrogen cooling is, as I have said, due to the practice of employing the conventional single-stage of rotor-mounted fan blades. It is, however, within the contemplation of my invention to employ other forms of pump. These may take the form, for example, of employing a plurality of stages of coacting fan-blades on rotor and stator or of a separately-powered blower, fan or pump of known type intercalated in the hydrogen system to give sufficient pressure-gradient to impart any desired velocity to the hydrogen through the ducts. With such an arrangement, the hydrogen cooling effect may be increased by raising the velocity factor in the pressure-velocity product while keeping the pressure at around one atmosphere, or by increasing both pressure and pressure-gradient to values above those which, as above explained, were characteristic of the prior art.

An object of my invention, therefore, is to provide a high-voltage dynamo-electric machine, having the above-described cooling systems whereby two- or three-fold increases, or better, may be made in the ratings of both the stator and rotor members of the machine.

Another object of my invention is to provide means for forcing the coolant to flow through the cooling ducts at substantially higher velocities than has been the practice in the prior art.

Further objects of my invention relate to details of the cooling duct construction, particularly the cooling duct construction which is necessary for the high-voltage stator members of such machines.

With the foregoing and other objects in view, my invention consists in the circuits, systems, combinations, structures, parts, and methods of operation and assembly, hereinafter described and claimed and illustrated in the accompanying drawing, wherein:

Figure 1:
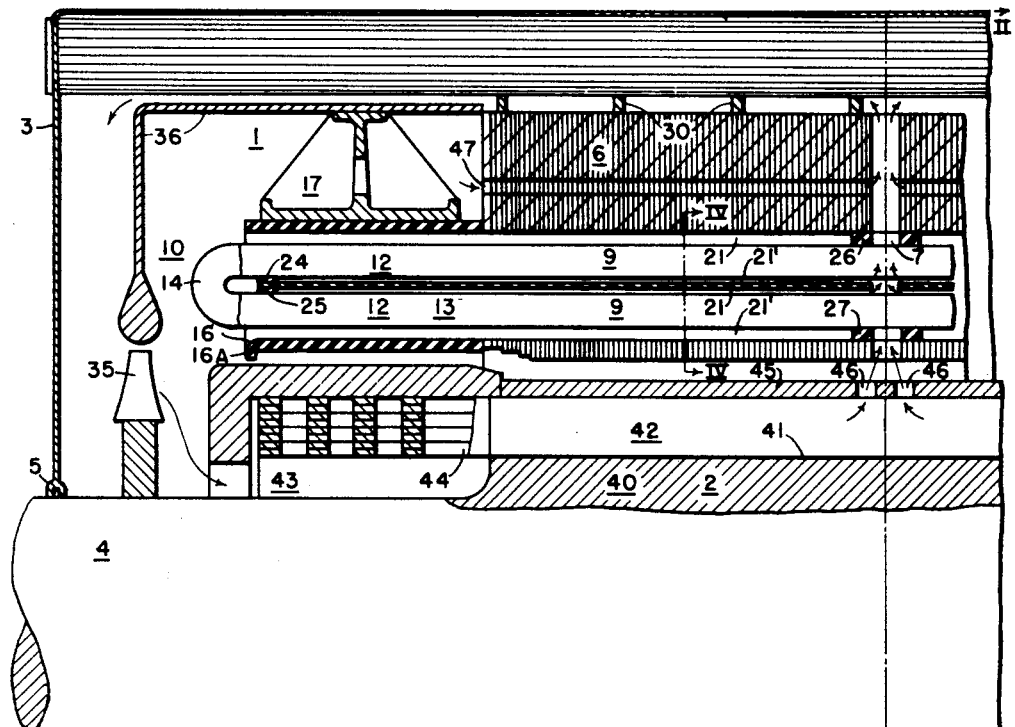
Figure 1 is a very schematic longitudinal section of a trifle more than the top left-hand quarter of a turbine generator, showing an exemplary form of embodiment of my present invention in a form in which high-pressure hydrogen is used for both the stator and the rotor with the same hydrogen pressures prevailing throughout the machine.
Figure 7:
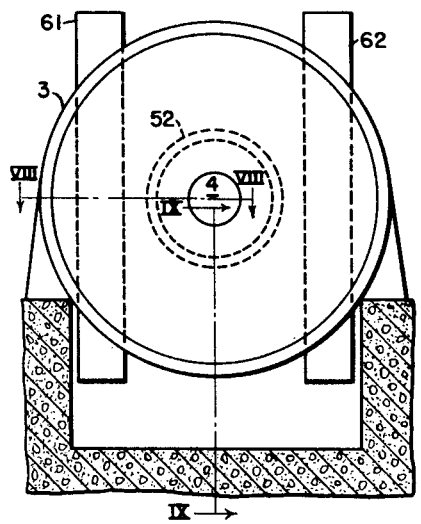
Figure 8:
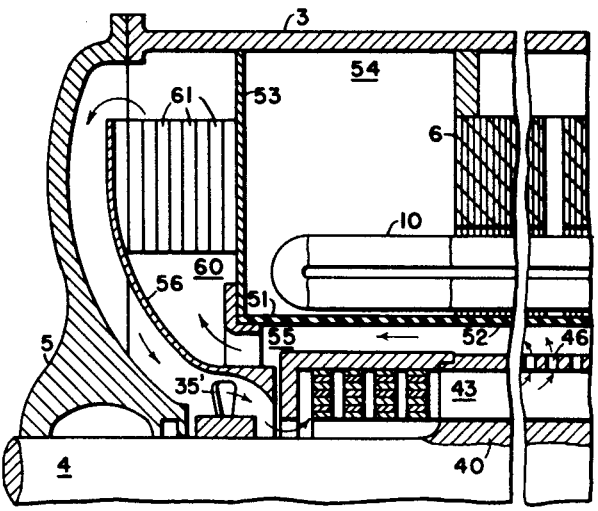
Figure 9:
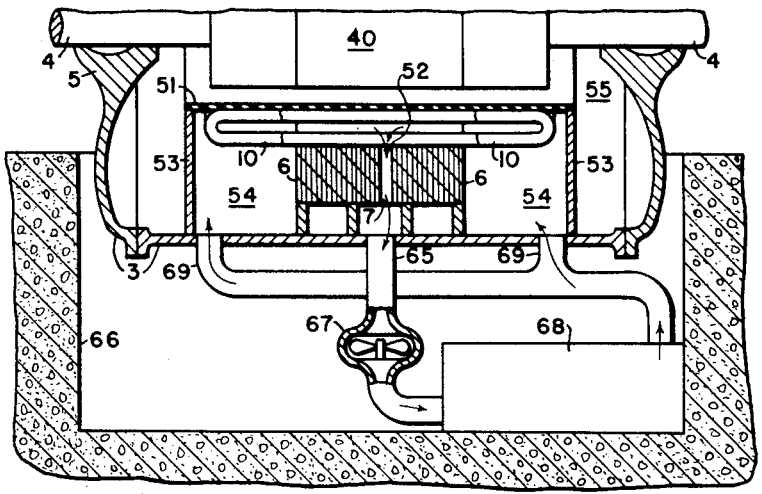
Figure 10:
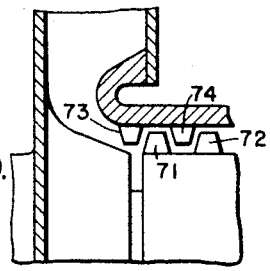

Fig. 7 is a diagrammatic end view of a different type of turbine generator in which a cylindrical insulating member is secured to the airgap bore of the stator core for dividing the machine housing into separate outer and inner compartments for the stator and rotor members, respectively, so that the cooling medium which is used for the stator may be of a different material, or at a different pressure than that which is used for the rotor member;

Fig. 8 is a somewhat diagrammatic horizontal sectional view on a larger scale, showing somewhat more than the top left-hand quarter of the machine shown in Fig. 7, the section plane being indicated at VIII—VIII in Fig. 7;

Fig. 9 is a reduced-scale and somewhat diagrammatic vertical sectional view of the bottom half of the complete length of the machine, as seen on a section plane indicated by the line IX—IX in Fig. 7; and Fig. 10 is a detail of a multistage fan which may replace the single stage fan of Fig. 1 for certain purposes.

In the form of my invention shown in Figs. 1 to 6, a large polyphase turbine generator is shown, comprising a stator member 1 and a rotor member 2 enclosed in a gas-tight outer frame housing 3. The rotor is shown as being mounted on a shaft 4 which extends out through the housing 3 in a gas-tight journal-bearing joint which may be regarded as being symbolically indicated at 5. The previously used gland seals 5 which have previously been developed for preventing excessive leakage of hydrogen at the place where the shaft passes through the housing are capable with little adaptation of withstanding the high hydrogen pressures which I may use, so that there is no real difficulty here. I have contented myself in Fig. 1 with merely a diagrammatic showing of a housing 3 which is understood to be substantially gas tight.

The stator member 1 comprises a stator core 6 which is composed of a stack of annular magnetizable punchings or laminations, which have been diagrammatically illustrated as being divided into two stacks of laminations, divided by a wide annular ventilating space 7 in the middle of the machine between said two stacks, although in actual construction, this central annular vent space 7 may be filled with a number of axially spaced laminations so as to give the equivalent of a wide annular vent space having an axial width or length of perhaps two inches or whatever other spacing may be required. This single central annular vent space 7 is used in preference to the large number of small (or axially thin) radial ventilating spaces which are used in the common stator core structures in previous modern designs of turbine generators.

The stator core 6 is provided with conductor-receiving slots 8 for receiving the coil sides 9 of a high-voltage primary winding 10 made of preformed coils. It will be noted that the major portions of the primary coil sides 9 are straight flat-sided portions, lying in the stator slots 8. A short distance beyond each end of the stator core a bend 11 is made, joining each straight coil side 9 with a substantially straight flat-sided portion 12 of the end-turn portion 13 of the primary winding. The end of each straight end-turn portion 12 has another bend 14 which usually comprises the apex of a coil, joining the two halves of that coil together, although some of the bends 14 may lead to the machine terminals, as will be readily understood.

In Fig. 1, I have shown the end turns 13 of the primary winding 10, which extend out axially and circumferentially from each end of the slot-lying coil sides 9, kept at substantially the same radial distance from the shaft 4 as the coil sides 9 instead of extending out at an angle away from the shaft, as in conventional previous structures. As shown in Fig. 1, a cylindrical insulating coil-supporting means 16 underlies the end turns 13 at each end of the stator core 6, and the end turns are held clamped down against this cylindrical insulating support 16 by means of suitable coil braces 17 which cooperate with the underlying cylindrical insulating support 16 to clamp the end turns 11 against displacement or bending as a result of stresses set up by short-circuit currents.

In accordance with the Fig. 1 embodiment of my invention, I make provision of special cooling duct means for cooling the primary turns 10 throughout substantially the entire length of the conductors including not only the slot-lying straight coil sides 9 but preferably also substantially all of the end turns 13 except the bends 14, which are the furthest away from the stator core 6. One way of doing this involves the use of coil sides in pairs 19 and 19′ (Fig. 4), which are held spaced a short circumferential distance apart from each other, as by means of small vertical (or radial) spacers 20 (Fig. 6) disposed at suitable intervals along the length of the coil pairs 19 and 19′, both in the coil side portions 9 which lie in the slots 8 and in the straight end turn portions 13. Upper and lower cooling ducts 21 and 21′ may extend lengthwise along these coil pairs 19 and 19′, being molded into a continuous joint-free jacket J of insulating material. This material may cover both the coil side portions 9, which lie within the stator slots 8, the bends 11 at the ends of the stator core 6, and the straight end-turn portions 12, up to but not including the bends 14.

The material J serves as slot insulation for the coils, and the conductor-receiving slots are large enough in cross-sectional area to provide room for the conductors, the slot insulation, and the cooling ducts 21 and 21′.

Each of the coil sides 19, 19′ comprises a plurality of layers of strap copper. These straps may be insulated from each other, if desired, by a winding of thin tape or other insulation which interpose no substantial thermal resistance to heat flow, its thermal resistance being small relative to that of the main insulation of the copper of winding 10 from the slot walls which comprises the jacket J.

Figure 5:
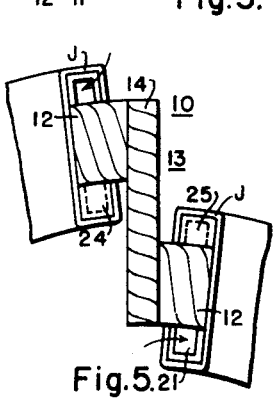
Fig. 5 is an end view of the apex of one of the stator coils in Fig. 1.
Figure 6:
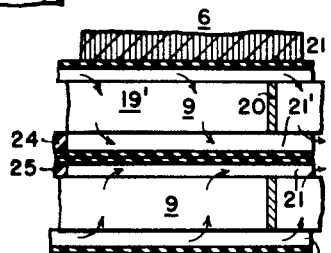
Fig. 6 is a detailed longitudinal section on a somewhat larger scale than Fig. 1, through the center of the left-hand end of one of the stator slots, on a section plane such as that indicated by the line VI—VI in Fig. 4A.

Like most turbine generators, the machine which I have illustrated is wound with a two-layer primary winding 10 so that the winding portions which lie in each stator slot 8 comprise two double-duct winding assemblies such as have already been described. In Fig. 5, I have shown the cooling-fluid—hydrogen in this instance—entering the top duct 21 of the top winding layer and the bottom duct 21′ of the bottom winding layer at the duct ends near the bends 14 at the apices of the respective coils. The bottom duct 21′ of the top layer and the top duct 21 of the bottom layer are blocked at this point, as diagrammatically indicated at 24 and 25 in Figs. 1 and 6. The cooling fluid thus enters through the open ducts and passes across the space between the two coil halves 19 and 19′ into the ducts which are blocked at the ends 14, as shown by the arrows in Fig. 6. At the center of the machine, where the annular vent 7 is located, the two ducts which were open at the bends 14 are blocked, as shown at 26 and 27 in Fig. 1, so that the cooling gas leaves through the cooling ducts which were blocked at the bends 14, thus discharging into this annular vent space 7 and passing radially outward to the outer periphery of the stator core 6, as shown by the arrows in Fig. 1.

Figure 2:
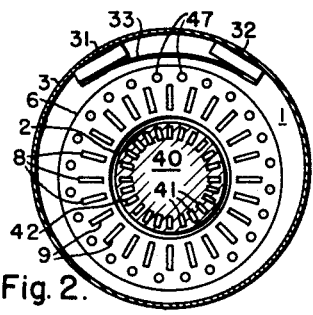
Fig. 2 is a very diagrammatic, reduced scale, central cross-section through the machine on a section plane indicated by the line II—II in Fig. 1, showing the general idea of the path of the hydrogen through the coolers.

The outer periphery of the stator punchings 6 is supported by means of a plurality of heavy, axially spaced supporting rings 30, as shown in Fig. 1. The frame housing 3 has a cylindrical body portion, which in the design illustrated in Fig. 2 is somewhat eccentric with respect to the stator core 6, so that a larger spacing between the housing 3 and the core 6 is provided at the top of the machine than at the bottom. In the space provided by this larger spacing, I have shown two axially extending coolers or heat exchangers 31 and 32, which are spaced annularly from each other and which are joined at their bottoms or inner sides by means of a horizontal baffle 33 which causes the gas which flows radially outwardly from the annular stator vent space 7 to flow in two streams flowing circumferentially toward each other across the two axially extending coolers 31 and 32 into the axially extending space between these two coolers, through which the gas returns to the respective ends of the machine after having been cooled.

Recirculation of the gas is maintained by means of a fan 35 (Fig. 1), which is carried by the shaft 4 at each end of the rotor member 2. A suitable end baffle 36 is provided at each end of the machine for causing the gas which is cooled by passing through the coolers 31 and 32 to be delivered to the intake sides of the fans 35, and to be thus blown axially inwardly into the machine to maintain the circulation.

The fan blades 35 in Fig. 1 are intended to be symbolical of a device for imparting velocity to the cooling gas through the cooling ducts already mentioned. The design of such pressure-developing device capable of imparting the velocity desired in any particular case is well within the skill of designing engineers, and the form arrived at may, of course, be substantially different from the fan blades 35 herein shown.

The rotor-member 2 is provided with a rotor core 40 (Figs. 1 and 2), which is also provided with conductor-receiving slots 41 in which are located the coil sides 42 of the field winding 43 of the machine, which constitutes the rotor winding. This field winding 43 is preferably made up of hollow or U-shaped conductors 44 similar to the conductors described in my Patent 2,221,567, granted November 12, 1940, except that I now use these hollow conductors with hydrogen under such increased pressure and/or linear velocities in the ducts that a great deal more heat can be removed from the rotor conductors than formerly. Near the center of the rotor, about under the stator annular vent space 7, the slot wedges 45 of the rotor, as well as the U-shaped rotor conductors 44, are provided with radial openings or vents 46 through which the hydrogen is expelled to the airgap, thence entering the airgap end of the annular stator vents 7 and joining with the stator-cooling hydrogen to be cooled by the coolers 31 and 32 and then recirculated by the fans 35 to the respective ends of the machine.

The stator core 6 and usually also the rotor core 40 are provided with suitable axially extending vent holes for directly cooling the stator or rotor iron. Thus, in Fig. 1, I have shown an axially extending stator vent 47 in the back part of the stator laminations, back of the conductor-receiving slots 8; and in Fig. 4A, I have shown another axially extending stator vent 48, located in one of the stator teeth to show how the stator teeth may be cooled. These iron-cooling or core-cooling vents are or may be conventional.

Figure 4A:
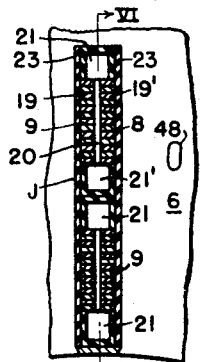
Fig. 4A is a cross-sectional detail of two of the stator slots on the sectional plane similar to that indicated at IV—IV in Fig. 1 in a modification of my invention in which the slot insulation between the current-carrying conductors and the slot walls is built up from separate plates and channels of insulating material instead of being molded or otherwise formed into a continuous sheath.

Instead of forming the insulation J between the coil sides 19, 19' and slots 8, 9 as a molded joint-free jacket J, it may in accordance with Fig. 4A comprise stiff, preformed U-shaped insulating channels which lie respectively over and under the two paired parts 19 and 19', including both the coil side portions 9 which lie within the stator slots 8, the bends 11 at the ends of the stator core 6, and the straight end-turn portions 12 up to but not including the bends 14.

In order to provide suitable insulation-surface creepage distances, the lateral sides of the U-shaped cooling ducts 21 and 21' and the lateral sides of the spaced conductor pairs 19 and 19' are flush and are covered by flat overlapping insulating barriers 23 which extend along the sides of the coil structures which are provided with the cooling ducts 21 and 21'. The portions of the insulating channels 21 and 21' and the insulating barriers 23 which lie within the conductor-receiving slots 8 serve as slot insulation for the coils, and the conductor-receiving slots are large enough in cross-sectional area to provide room for the conductors, the slot insulation, and the cooling ducts 21 and 21'.

Insulation of the type shown in Fig. 4A, which comprises separate channels and plates with joints between them, is susceptible to electrical discharge through these joints where, as is usually the case in the stator windings of generators such as those here being described, the winding conductors operate at several thousand volts, e.g. five thousand volts, above the slot walls in which they are situated. This naturally creates an insulation difficulty, and the electrical discharges through the joints in the insulation causes deterioration of the latter, particularly in the case of windings of the prior art where air was used as the ventilating fluid. Similar difficulties from electrical discharge are also met in the case of such jointed insulation, even where the ventilating medium is hydrogen at or only moderately above atmospheric pressure. However, by raising the hydrogen pressure, the voltage at which these electric discharges make difficulty is greatly increased at pressures of the order of fifty pounds per square inch, and the use of hydrogen at or above that value eliminates a difficulty which would have prevented the use of cooling ducts between the current-carrying conductors and their principal insulation from the slot walls, had the jointed type of insulation been attempted with hydrogen at the pressures heretofore used in the dynamo-electric machine-cooling art.

Figure 3:
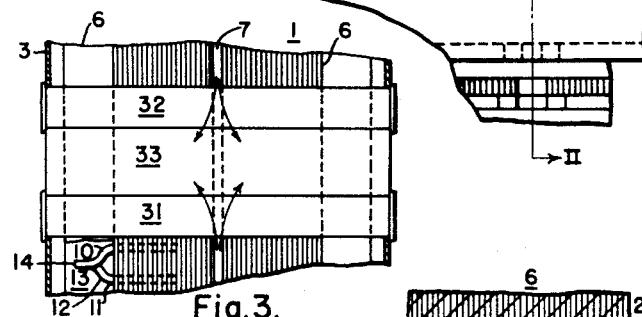
Fig. 3 is a somewhat schematic, developed, reduced-scale plan view of a portion of the outer periphery of the machine, such as would be obtained by removing the outer shell from the machine of Fig. 1 and looking down radially at each point of the stator member as far around as the circumferential extent covered by Fig. 3, that is, around the top portion of the machine.
Figure 4:
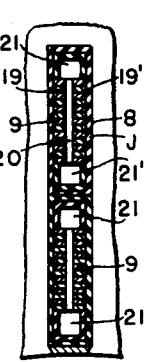
Fig. 4 is a cross-sectional detail of two of the stator slots on a section plane such as that indicated at IV—IV in Fig. 1.

The structures and description of Figs. 1, 2 and 3 apply, whether the insulation is of the Fig. 4 form or the Fig. 4A form.

The insulating support 16 may have an overturned lip 16A closely spaced from the periphery of rotor 2, or otherwise provide means to constrict the passage for gas from fan 35 axially through the air-gap between rotor 2 and the stator. This greatly assists cooling of the rotor conductors by insuring that a sufficient part of the cooling-gas from fan 35 flows into the ducts through the rotor windings.

In the form of my invention which is shown in Figs. 7, 8 and 9, the space within the frame housing 3 is subdivided by means of a cylindrical insulating member 51 which is secured to the airgap bore 52 of the stator core 6, and which extends axially beyond the stator core at each end of the machine. The ends of the cylindrical insulating member 51 are hermetically joined to some portion of the frame housing 3, as by means of annular partitions 53 which effect airtight joints between the cylindrical insulating member 51 and the frame housing 3. Thus, the cylindrical member 51 divides the space within the frame housing into separate outer and inner chambers 54 and 55. The stator core 6 and stator winding 10 are disposed within the outer chamber 54, while the rotor core 40 and the rotor winding 42 rotate within the inner chamber 55.

In the divided construction shown in Figs. 7, 8 and 9, it is necessary to provide different recirculating paths for the coolants in the outer and inner chambers 54 and 55 because these two chambers are hermetically sealed from each other.

The inner chamber 55, as shown in Figs. 7 to 9, is preferably filled with hydrogen, and this rotor-cooling hydrogen is preferably circulated by means of two rotor fans 35' (Fig. 8). The rotor-cooling hydrogen is returned from the radial rotor vents 46 through the part of the airgap which is just inside of the inner surface of the cylindrical insulating member 51, thus returning from the center of the rotor to each of the ends of the rotor, as shown in Fig. 8. At each end of the machine, the rotor-cooling hydrogen is led by a suitable baffle 56 to the end space 60 which is axially beyond the annular partition 53 which marks that end of the outer chamber 54. Suitable coolers or heat exchangers 61 and 62 are provided in these end spaces 60 at the respective ends of the machine, these coolers being illustrated as extending vertically. The baffling means 56 are arranged so that the rotor-cooling hydrogen flows across the vertical cooler 61 or 62 and then returns to the intake side of the rotor fan 35' at that end of the machine.

The outer chamber 54 in Figs. 7 to 9 may be filled with either hydrogen or some other gas, which is necessarily heavier than hydrogen because hydrogen is the lightest gas, or it may be filled with an insulating liquid coolant. Since the coolant in the outer chamber 54 is hermetically sealed within itself, it need not be at the same pressure as the hydrogen which fills the inner chamber 55. However, there is an advantage, from one standpoint, in having the fluid coolant of the outer chamber 54 at somewhere near enough to the same pressure as the coolant in the inner chamber 55, so that the cylindrical insulating member 51 does not have too great mechanical strains placed thereon in withstanding the pressure differences between the inner and outer surfaces of this cylindrical member, thus making it possible to use a thinner insulating member 51, which takes up less space in the airgap of the machine. If the inner chamber 55 is filled with hydrogen at a pressure of about fifty pounds per square inch, for example, the pressure which is maintained on the fluid filling in the outer chamber 54 might well be at least 40 pounds per square inch over the surrounding atmosphere, thus avoiding excessive pressure differences on the partitions 51—53.

Any suitable means may be provided for circulating the coolant in the outer chamber 54 of the construction shown in Figs. 7 to 9. In the form of embodiment chosen for illustration, as shown in Fig. 9, the coolant which is discharged radially out of the central annular vent space 7 in the stator core 6 is collected in the annular space between the stator core 6 and the frame housing 3 and then discharged through an outlet pipe 65 which may conveniently go down into the pit 66 over which the machine is located where the coolant passes first through a pump 67 and then through a cooler or heat exchanger 68 from which the coolant is delivered to inlet pipes 69 going to the respective ends of the outer chamber 54.

The pump 67 is symbolic of any pressure-producing device which will be evident to engineers, and its details are no part of my present application, just as the fan blades 35 in Fig. 1 are merely intended to be symbolic of any device directly attached to shaft 4 and capable of producing a gas velocity through the cooling duct system.

As has been stated above, the single-stage fans with fan-blades at the rotor periphery, which were previous practice, could produce a pressure-head at the duct terminals of not over 3500 feet for generators operating at the usual 3600 r.p.m. speed. This figure can be transformed to a pressure $\Delta$, in pounds per square inch for example, by the formula $\Delta = P \times H \times 12 \times \rho$, where P is the gas pressure in atmospheres, H the "head" just mentioned and $\rho$ the weight in pounds of 1 cubic inch of the gas at atmospheric pressure.

The velocity $V_D$ of the gas through a duct obeys a formula $$\Delta = C\frac{V_D^2}{2g} + \frac{4fl}{D}\left(\frac{V_D^2}{2g}\right) = C_1\left(\frac{V_D^2}{2g}\right)$$

where $f$ is a friction factor for the duct, L the duct length in inches, D the diameter of the duct in inches, $g$ the acceleration constant for gravity, and C a constant representing dynamic-head-loss; all of the quantities $f$, L, $g$ and D and C being substantially constants within the limits of conditions in which my invention will find practical use, and so properly represented by $C_1$ in this formula.

As previously stated, the cooling-effect of a given gas is, under the conditions likely to exist in generator cooling-ducts under my invention, a function of the product $PV_D$; to a fairly close approximation the heat dissipated in unit time is proportional to $(PV_D)^{0.8}$. However, this is true only when the gas operates under conditions of turbulent flow, i.e., conditions for which the dimensionless quantity $$\frac{PV_D\rho D}{\mu}$$

is equal to at least 3000; $\mu$ being the viscosity of the gas, and the other quantities as defined above, all of course in inch-second-pound units of measurement. For values of $$\frac{PV_D\rho D}{\mu}$$

not far below 3000 turbulent flow disappears and the heat-dissipating power of the cooling-gas is likely to drop off rapidly. It is found that a two-stage fan operating on gas at atmospheric pressure will produce a considerable improvement over a single-stage fan on the machine disclosed, but a two-stage fan would not produce nearly so great an improvement over a single-stage fan in a machine in which the winding is not inner-cooled.

As has been previously stated, the pressure-head at the duct terminals is limited by design conditions to a maximum of about 3500 feet where a single set of fan blades mounted at the periphery of the rotor is used to produce that pressure head. However, greater pressure heads, and consequently greater cooling in the ducts, will result if multi-stage fans are substituted for the single-stage fans which are subject to this limitation. In this way, pressure heads may be attained which are at least proportional to the number of fan-stages. Fig. 10 of the drawings shows schematically the form which such multi-stage blades may take. The blades 71 and 72 are, as shown, mounted near the periphery of the rotor while the blades 73 and 74 are mounted upon the stator. A two-stage fan, such as is shown in Fig. 10, will create a maximum pressure-head $$H = \frac{V^2}{2g}$$

which is twice the previously stated formula for a single-stage fan of the same outer diameter and speed of rotation.

As an alternative to the use of multi-stage fans driven by the rotor, each stage of which is likely to be limited to definite pressure heads by the formula given above for single-stage fans, I may impart velocity to the cooling gas through the ducts by interposing a pump or blower of any known type which is found suitable in the circulating system of the gas. For example, this blower may be interposed in the gas-circulating system by collecting the gas flowing from the annular channel 7 in an off-take duct leading to such a pump or blower mounted on the framework of the stator in Fig. 1 between the coolers 31 and 32. The outlet from this blower will then be attached to the inlet orifices of the coolers themselves so that the gas from the pump will be driven through the coolers and thence follow the remainder of the circulating-system. An alternative would be to arrange the off-take duct from duct 7, the pump and the gas-cooler as are the ducts 65, the pump 67 and the cooler 68 in Fig. 9.

While I have described hydrogen as the specific gas to be employed in my cooling system, and this gas seems to have many advantages over others such as helium or sulphur hexafluoride, to give two examples, the use of other gases than hydrogen is within the purview of my invention.

My invention thus makes it possible to greatly increase the cooling rate of both the rotor and the stator of a turbine generator or similar dynamo-electric machines so that a corresponding increase can be obtained in the rating of the machine. This increased rating of the machine is important in these days of rising costs of materials and labor. The increased rating which I obtain is secured at little or no extra cost because it involves only the substitution of channeled insulation formed around the conductors or conductors having cooling ducts built within the conductors themselves in place of using conductors having a solid wall of insulation surrounding them, and the use of cores having conductor-receiving slots which are large enough to provide space for the ducts and the insulation as well as the conductors and the use of a suitable recirculating system for the high-heat-transport hydrogen or other cooling fluid.

Certain features of my invention as herein described and illustrated have been made the subject matter of a divisional application, Serial No. 378,110, filed September 2, 1953, covering the use of a liquid in the inner-cooling of a dynamo-electric machine, and the use of separate cooling systems for the stator and the rotor (and more specifically the use of a cylindrical wall in the air gap).

Certain broad features of the stator-winding cooling, using preformed overlapping barriers to form axial ventilating ducts lying against the primary winding conductors in the stator slots, in combination with circulated high-pressure hydrogen or other coolant having a high insulation strength, as described herein, constitute the subject matter of claims in the previously mentioned application of G. L. Moses, Serial No. 110,010, filed August 12, 1949.

While I have described my invention in several illustrative forms of embodiments, it is to be understood that these explanations were intended only to be illustrative and that my invention is not limited to the illustrated structural arrangements, or the like. I desire, therefore, that the appended claims shall be accorded the broadest construction consistent with their language.

I claim as my invention:

1. A dynamo-electric machine having stator and rotor members, at least one of said members comprising an annular core having axially extending conductor-receiving slots therein; and a winding having flat-sided winding-portions disposed within said axially-extending conductor-receiving slots, each of said winding-portions having two laterally spaced paired parts, an upper and a lower stiff, preformed, U-shaped insulating-channel lying respectively over and under the two paired parts of each of said winding-portions within a slot, with the edges of the respective channels resting respectively on the top and bottom of said paired parts, substantially flush with the flat sides of that winding-portion, flat axially extending insulating barriers disposed laterally against the respective sides of the several slot-lying winding-portions in overlapping relation to the contact-lines between the several winding-portions and their associated insulating-channels, means for providing a fluid-tight chamber within which said core and its winding are located, a filling of an electrically insulating fluid in said chamber, means for providing a recirculating path for said fluid with said fluid flowing in said insulating-channels and between the spaced paired parts of the winding-portions, and heat-exchanging means included in said recirculating path for cooling said fluid.

2. A dynamo-electric machine having stator and rotor members, and an enclosing housing, at least one of said members comprising a core having axially extending conductor-receiving slots therein, a winding having a rating of at least 10,000 volts having winding-portions disposed in said conductor-receiving slots, slot-insulation also disposed in each conductor-receiving slot, each conductor-receiving slot being sufficiently larger than the space-requirements of the winding-portion or portions and the slot-insulation disposed therein so as to provide a slot duct-system including an axially extending cooling-duct or ducts in such manner that at least a part of each slot duct-system is bounded by a portion or portions of the winding-portions disposed in that slot with no substantial amount of insulation between the winding-conductor and the duct-system, said enclosing housing providing a gas-tight chamber within which said core and its winding are located, a filling of a gas having heat-scavenging properties substantially equivalent to those of hydrogen, in said chamber, at a pressure of at least 50 pounds per square inch over the surrounding atmosphere, means for providing a recirculating path for said gaseous filling flowing axially within said cooling-ducts, and heat-exchanging means included in said recirculating path for cooling said gaseous filling.

3. A hydrogen-cooled dynamo-electric machine having stator and rotor members, and an enclosing housing which provides a gas-tight chamber within which both of said stator and rotor members are disposed, said rotor member having a peripheral speed of at least 28,000 feet per minute whereby windage losses need to be carefully considered, a filling of hydrogen in said chamber at a pressure of at least 50 pounds per square inch over the surrounding atmosphere, said stator member and said rotor member each including a core having axially extending conductor-receiving slots therein, a winding having a rating of at least 10,000 volts having winding-portions disposed in said conductor-receiving slots of said stator, slot-insulation also disposed in each conductor-receiving slot, each conductor-receiving slot being sufficiently larger than the space-requirements of the winding portion or portions and the slot-insulation disposed therein so as to provide a slot duct-system including an axially extending cooling-duct or ducts in such manner that at least a part of each slot duct-system is bounded by a portion or portions of the winding-portions disposed in that slot with no substantial amount of insulation between the winding-conductor and the duct-system, means for providing a recirculating path for said hydrogen flowing axially within the cooling-ducts of each of said cores, and heat-exchanging means included in said recirculating path for cooling said hydrogen.

4. A dynamo-electric machine having stator and rotor members, the rotor member having a shaft, said stator member having an annular stator-core having axially extending conductor-receiving slots therein, a wound stator-winding having preformed coils having coil-side portions lying within said conductor-receiving slots of said stator-core and end-winding portions extending axially and circumferentially beyond each end of the stator-core, cylindrical insulating end-turn supporting-means underlying the end-winding portions at each end of the stator-core and coil-supporting means, overlying said end-winding portions for bracing said end-winding portions against the respective cylindrical end-turn supporting-means, characterized by each half of each of a plurality of said stator-winding coils having a flat-sided slot-lying winding-portion disposed within a conductor-receiving slot, a substantially straight flat-sided end-portion which extends both axially and circumferentially at each end of said slot-lying portion, and bends at the ends of said substantially straight end-portions; said slot-lying portion, substantially all of both substantially straight end-portions, and the intervening bends of each of said halves of coils being of a vented construction having one or more cooling-ducts running along the length of the winding-conductors; means for providing a fluid-tight chamber within which said core and its winding are located; a filling of an electrically insulating fluid in said chamber; means for providing a recirculating path for said fluid flowing within said cooling-ducts; and heat-exchanging means included in said recirculating path for cooling said fluid.

5. A dynamo-electric machine having stator and rotor members, at least said stator member having a rating of at least 10,000 volts and comprising an annular core having axially extending conductor-receiving slots therein; and a wound winding having preformed coils; each half of each of a plurality of said coils having a flat-sided slot-lying winding-portion disposed within a conductor-receiving slot, a substantially straight flat-sided end-portion which extends both axially and circumferentially at each end of said slot-lying portion, and bends at the ends of said substantially straight end-portions; said slot-lying portion, substantially all of both substantially straight end-portions, and the intervening bends of each of said halves of coils being of a vented construction having one or more cooling-ducts running along the length of the winding-conductors; means for providing a fluid-tight chamber within which said core and its winding are located; a filling of an electrically insulating fluid in said chamber; means for providing a recirculating path for said fluid flowing within said cooling-ducts; and heat-exchanging means included in said recirculating path for cooling said fluid.

6. In a dynamo-electric machine having a cylindrical laminated armature member with a plurality of circumferentially spaced axially extending slots, the combination of an insulated conductor bar assembly disposed in each of said slots, each bar comprising a plurality of members including conductors insulated from each other and surrounded by a main insulating covering, at least some of said members defining axial fluid cooling passages disposed within said main covering, at least one end of each bar having the end portions of the conductors and covering extending circumferentially, said bar being electrically bonded to the conductor end portions of another bar disposed in a circumferentially spaced slot, the passages within the two said bars having ends separated by distances which are smaller than the circumferential distances between said spaced slots.

7. In a dynamo-electric machine having a laminated armature member with a plurality of circumferentially spaced axially extending slots, the combination of a pair of radially aligned insulated conductor bar assemblies disposed in each slot, each bar comprising a plurality of conductors insulated from each other and surrounded by a main insulating covering with axial fluid cooling passages defined by members within said main covering, the radially inner bar in each slot having at least one end portion projecting from the end of the armature slot and extending circumferentially, with the conductors thereof electrically bonded to the conductor end portions of a bar disposed in the radially outer portion of a circumferentially spaced slot, the cooling passages in said inner bar having outlets close to the outlets of the cooling passages of said electrically connected bar.

8. In a dynamo-electric machine, the combination of an armature member having a plurality of axially extending slots, each containing at least one conductor bar assembly comprising a plurality of members including conductors and surrounded by a main insulating covering, at least some members within said main covering defining longitudinal cooling fluid passages, means providing electrical insulation between the respective conductors, the end portions of each bar and covering projecting from the ends of the armature slots and bending to extend circumferentially, at least one end of each bar having the extreme end portions of the conductors thereof electrically bonded to the projecting end portions of the conductors of another bar disposed in a circumferentially spaced slot, the coolant passages in the bar ending close to the fluid passages in said other bar.

9. In a dynamo-electric machine having an armature member with a plurality of circumferentially spaced axially extending slots, the combination of a pair of radially aligned insulated conductor bar assemblies disposed in each slot, each bar comprising a plurality of members including conductors and surrounded by a main insulating covering, at least some of said members defining axial fluid cooling passages, the radially inner bar in each slot having at least one end portion projecting from the end of the slot and bending to extend circumferentially, with the conductors thereof bonded in conductive relation to the extreme end portions of the conductors of another bar disposed in the radially outer portion of a circumferentially spaced slot, the coolant passages in said radially inner bar having ends separated from the ends of the coolant passages of said other bar by a distance substantially smaller than that separating said circumferentially spaced slots.

10. A dynamo-electric machine having stator and rotor members, at least said stator member having a rating of at least 10,000 volts and comprising an annular core having axially extending conductor-receiving slots therein; and a wound winding having preformed coils; each half of each of a plurality of said coils having a flat-sided slot-lying winding-portion disposed within a conductor-receiving slot, a substantially straight flat-sided end-portion which extends both axially and circumferentially at each end of said slot-lying portion, and bends at the ends of said substantially straight end-portions; said slot-lying portion, substantially all of both substantially straight end-portions, and the intervening bends of each of said halves of coils being of a vented construction having one or more cooling-ducts running along the length of the winding-conductors; means for providing a fluid-tight chamber within which said core and its winding are located; a filling of an electrically insulating coolant fluid in said chamber; means for providing a recirculating path for a coolant fluid flowing within said cooling ducts; and heat-exchanging means included in said recirculating path for cooling said fluid.

References Cited in the file of this patent

UNITED STATES PATENTS

| 1,546,234 | Hannah | July 14, 1925 |
| 2,173,717 | Hobart | Sept. 19, 1939 |
| 2,221,567 | Baudry | Nov. 12, 1940 |
| 2,295,404 | Johns | Sept. 8, 1942 |
| 2,451,219 | Holmgren | Oct. 12, 1948 |

FOREIGN PATENTS

| 21,822 | Great Britain | of 1912 |
| 312,607 | Germany | May 30, 1919 |
| 574,962 | Germany | Apr. 22, 1933 |
| 714,319 | France | Sept. 1, 1931 |

OTHER REFERENCES

A.I.E.E. Transactions for 1950, pp. 191 to 194, published by A.I.E.E., 33 West 39th St., N.Y.C.